(12) United States Patent
White et al.

(10) Patent No.: US 8,514,839 B2
(45) Date of Patent: Aug. 20, 2013

(54) INTERNET PROTOCOL (IP) ADDRESS EXCHANGE SERVICE

(75) Inventors: Isaac D. M. White, Groveland, FL (US); James Dickens, Ocoee, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1160 days.

(21) Appl. No.: 10/401,213

(22) Filed: Mar. 27, 2003

(65) Prior Publication Data

US 2004/0190495 A1 Sep. 30, 2004

(51) Int. Cl.
*H04L 12/66* (2006.01)

(52) U.S. Cl.
USPC ............................................. 370/352

(58) Field of Classification Search
USPC ................ 370/352, 353, 354, 389, 392
See application file for complete search history.

(56) References Cited

U.S. PATENT DOCUMENTS

| | | | | |
|---|---|---|---|---|
| 6,069,890 A | * | 5/2000 | White et al. | 370/352 |
| 6,075,783 A | * | 6/2000 | Voit | 370/352 |
| 6,125,113 A | * | 9/2000 | Farris et al. | 370/389 |
| 6,424,657 B1 | * | 7/2002 | Voit et al. | 370/412 |
| 6,677,976 B2 | * | 1/2004 | Parker et al. | 348/14.08 |
| 6,956,843 B1 | * | 10/2005 | Breivik et al. | 370/352 |
| 7,023,831 B2 | * | 4/2006 | Okuyama | 370/342 |
| 7,035,260 B1 | * | 4/2006 | Betta et al. | 370/392 |
| 7,062,452 B1 | * | 6/2006 | Lotvin et al. | 705/26 |
| 7,072,341 B2 | * | 7/2006 | Xu et al. | 370/392 |
| 7,106,726 B2 | * | 9/2006 | Vaziri et al. | 370/352 |
| 2001/0006519 A1 | * | 7/2001 | Voit | 370/352 |
| 2002/0006787 A1 | * | 1/2002 | Darby | 455/419 |
| 2003/0072298 A1 | * | 4/2003 | Slobodin et al. | 370/352 |
| 2003/0128691 A1 | * | 7/2003 | Bergman et al. | 370/352 |

* cited by examiner

*Primary Examiner* — Marcus R Smith

(74) *Attorney, Agent, or Firm* — Scott P. Zimmerman, PLLC

(57) ABSTRACT

Methods and systems are disclosed for exchanging Internet Protocol addresses between parties to a telephone call. One method receives the telephone call from a calling telephone number to a called telephone number. The telephone call is connected to the called telephone number. At any time during processing of the telephone call, an Internet Protocol address associated with at least one of the calling telephone number and the called telephone number is communicated to either party via a data network and/or via the Public Switched Telephone Network.

20 Claims, 12 Drawing Sheets

INTERNET PROTOCOL (IP) ADDRESS EXCHANGE SERVICE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to telephony and to computer networks and, more particularly, to methods and systems for exchanging Internet Protocol (IP) addresses between parties to a telephone call.

2. Description of the Related Art

Napoleon Bonaparte's famous quote "un croquis vaut mieux qu'un long discours" ("a picture is worth a thousand words") could accurately describe telephone conversations. Try as we might, our telephone conversations are often fraught with verbal miscommunications. Words alone often cannot express even the simplest concepts or events between the parties to a telephone call. If we could augment our telephone calls with pictures, our calls would be better understood. A picture would help explain the topic of conversation, and a picture would make the conversation more productive—that is, the picture would more efficiently convey thoughts and help reduce the need for face-to-face meetings between the parties. There is, accordingly, a need in the art for augmenting telephone calls with web pages, emails, files, and other electronic content that may be simultaneously viewed during the telephone call.

BRIEF SUMMARY OF THE INVENTION

The aforementioned problems and other problems are reduced by an Internet Protocol (IP) address exchange service. This IP address exchange service is provided by a telecommunications service provider. This IP address exchange service uses many existing features and capabilities of a telecommunications network to communicate IP addresses between parties to a telephone call. The IP address exchange service of this invention allows one party to the telephone call to send, or "push," electronic data to a computer of the other party. This electronic data, such as web pages, emails, files, and other content, may then be simultaneously viewed on the computer during the telephone call. As the parties converse via the telephone call, the parties may augment the telephone conversation by viewing the electronic data on a computer.

This IP address exchange service allows one party to "push" electronic data/content to the other party. Because one party to the telephone call knows the Internet Protocol (IP) address of the other party, electronic data may be routed to another party's computer. This electronic data, such as web pages and pictures, may be visually and/or audibly presented on a computer as the parties simultaneously converse via the telephone call. As those of ordinary skill in the art understand, "pushing" electronic data describes web pages and other content that is unsolicited and automatically arrives. That is, no request or query was made for the electronic data. "Pushing" electronic data is akin to "pop-up" content or windows that automatically appear on a computer display. This invention, then, allows each party to a telephone call to push pictures, web pages, and other electronic data to a computer designated by the other party. These pictures, web pages, and any other electronic data are presented on the computer to augment, explain, or accompany the telephone call.

This invention discloses methods and systems for exchanging Internet Protocol addresses between parties to a telephone call. One method receives the telephone call from a calling telephone number to a called telephone number. The telephone call is connected to the called telephone number. At any time during processing of the telephone call, an Internet Protocol address associated with at least one of the calling telephone number and the called telephone number is communicated to either party via a data network and/or via the Public Switched Telephone Network.

This Internet Protocol (IP) address exchange service operates within a telecommunications network. Because the telecommunications network is intelligently switched, the telecommunications network comprises a plurality of Advanced Intelligent Network (AIN) components. A communication is received from a device communicating with the telecommunications network. The communication is from a calling telephone number to a called telephone number. Processing of the communication is suspended within the telecommunications network. A database is queried for at least one of i) the called telephone number and ii) the calling telephone number. The database stores telephone numbers of subscribers to the Internet Protocol address exchange service provided by a telecommunications service provider. The Internet Protocol address exchange service communicates Internet Protocol addresses between the parties to the telephone call. If the query is successful, processing of the communication is resumed within the telecommunications network. An Internet Protocol address associated with at least one of the calling telephone number and the called telephone number is then communicated.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
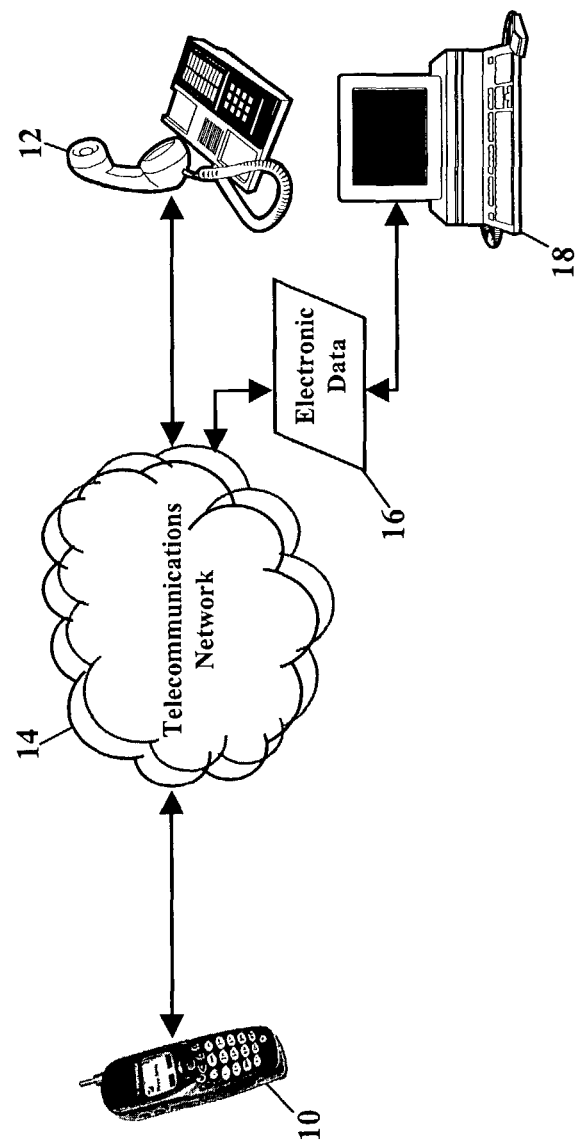
FIG. 1 is a simplified schematic illustrating an Internet Protocol (IP) address exchange service provided by a telecommunications service provider.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The present invention provides methods, systems, computer programs, and computer program products that exchange Internet Protocol (IP) addresses between parties to a telephone call. This IP address exchange service is provided by a telecommunications service provider. This IP address exchange service uses many existing features and capabilities of a telecommunications network to communicate IP addresses between parties to a telephone call. The IP address exchange service of this invention allows one party to the telephone call to send, or "push," electronic data to a computer of the other party. This electronic data, such as web pages, emails, files, and other content, may then be simultaneously viewed on the computer during the telephone call. As the parties converse via the telephone call, the parties may augment the telephone conversation by viewing the electronic data on a computer.

This invention describes an Internet Protocol (IP) address exchange service. This Internet Protocol (IP) address exchange service is provided by a telecommunications service provider. As the following paragraphs will explain, this Internet Protocol (IP) address exchange service allows a calling party and/or a called party to exchange Internet Protocol (IP) addresses during a telephone call. If either party to a telephone call knows the Internet Protocol (IP) address corresponding to the other party, electronic data may be sent between the parties. This electronic data, such as web pages, emails, files, and other content, may then be simultaneously viewed on a computer during the telephone call. As the parties converse via the telephone call, the parties may augment the telephone conversation with the electronic data.

FIG. 1 is a simplified schematic illustrating this Internet Protocol (LP) address exchange service. Suppose, for example, a calling party 10 places a telephone call to a called party 12 via a Telecommunications Network 14. As the parties converse on the phone, the calling party 10 wishes to augment the conversation with electronic data 16. This electronic data 16 could be pictures, charts, files, or any other electronic data 16 that augments, explains, and/or clarifies the conversation. This Internet Protocol (IP) address exchange service allows the calling party 10 to send, or "push," the electronic data 16 to an Internet Protocol (IP) address corresponding to the called party 12. As the parties converse via the telephone connection, the called party 12 simultaneously views this electronic data 16 on a computer 18. The computer 18 may be any computer the called party desires, but most likely the computer 18 is in the vicinity of the called party 12. The called party 12, likewise, may similarly "push" or send electronic data to an Internet Protocol (IP) address corresponding to the calling party 10. This Internet Protocol (IP) address exchange service, then, stores Internet Protocol addresses corresponding to computers associated with the called party and with the calling party. As the parties converse via the telephone call, this invention exchanges Internet Protocol (IP) addresses of the parties to a call, thus allowing the parties to simultaneously share the electronic data 16 during the telephone call.

Figure 2:
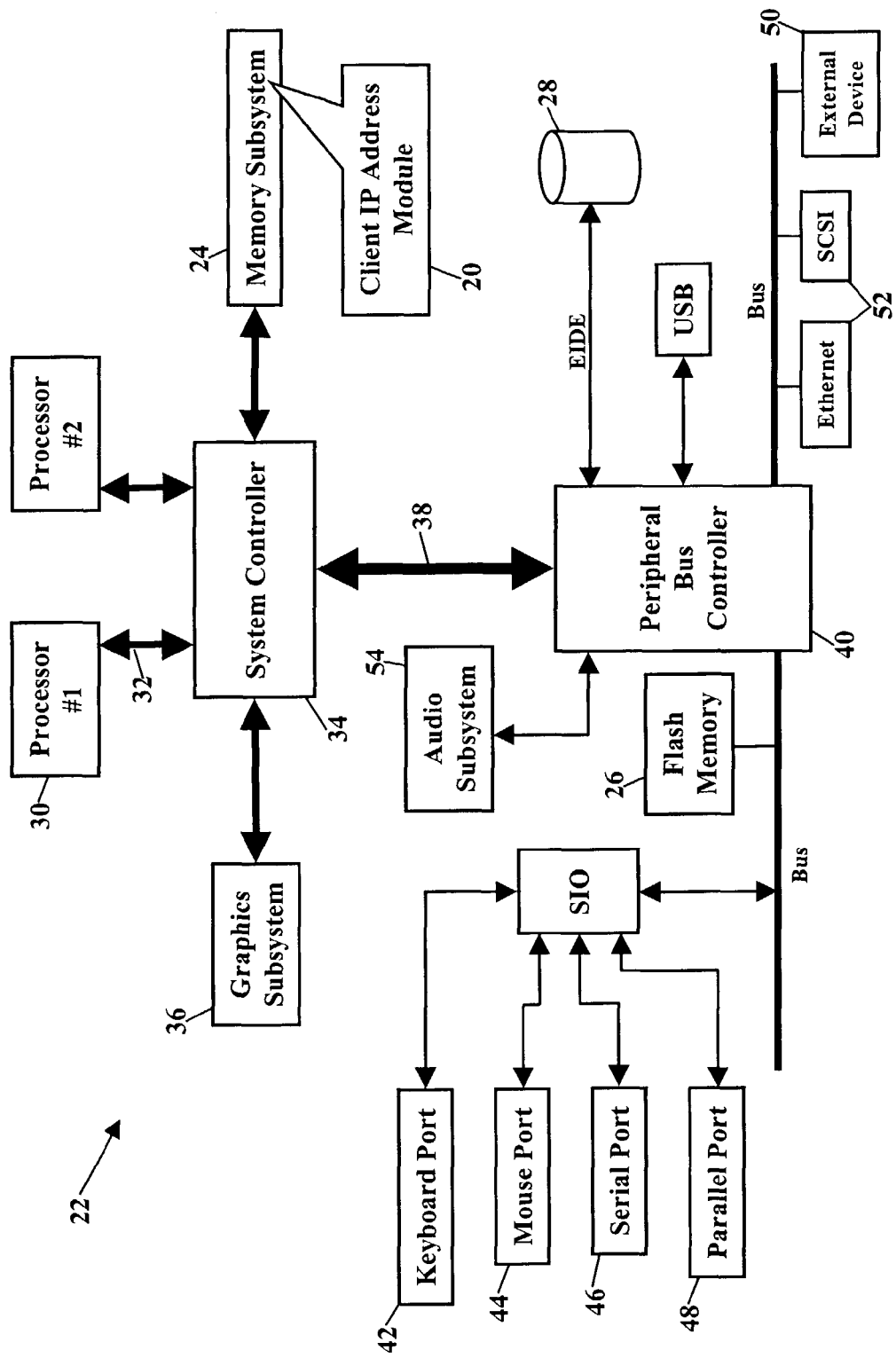
FIGS. 2 and 3 depict possible operating environments for an embodiment of the present invention.
Figure 3:
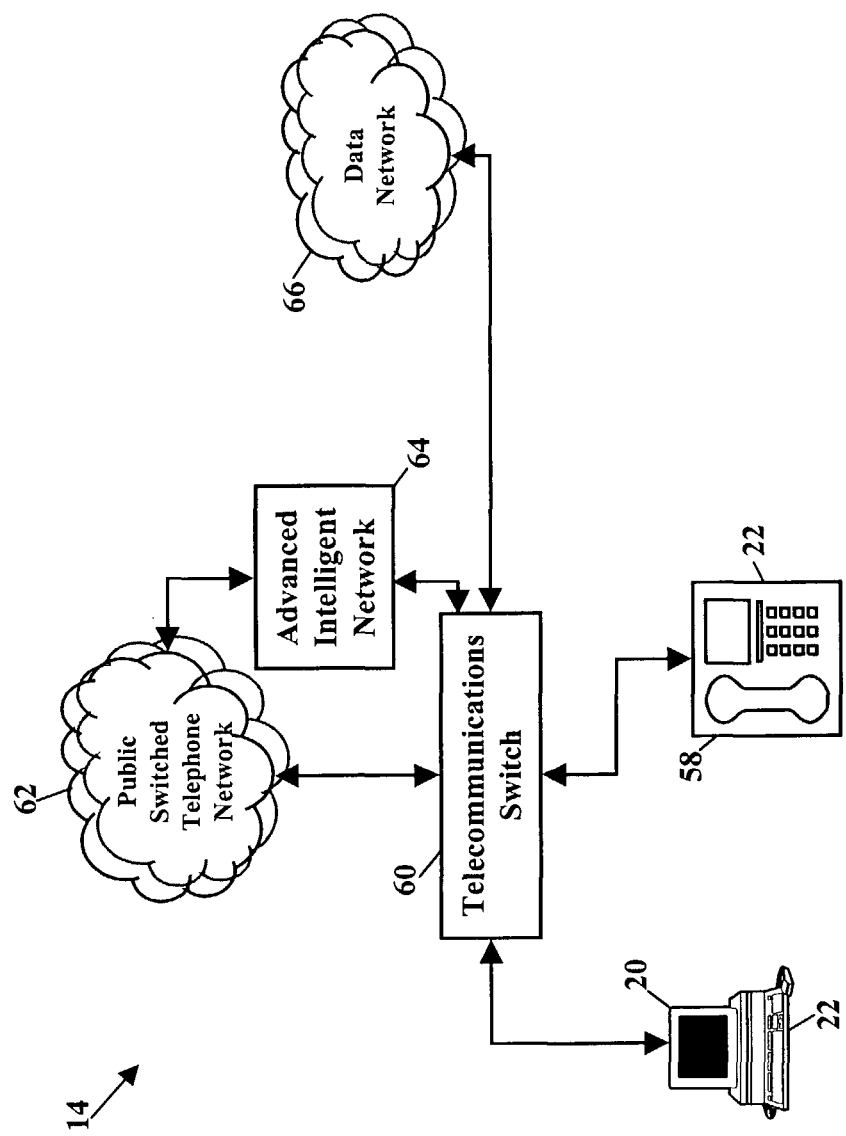

FIGS. 2 and 3 depict possible operating environments for an embodiment of this invention. This embodiment of a IP Address Exchange Module 20 includes a computer program that allows a user to associate Internet Protocol (IP) addresses with telephone numbers. The IP Address Exchange Module 20 allows the user to select what IP address should be exchanged when using a particular telephone (and its associated telephone number). The IP Address Exchange Module 20 evens allows a subscriber to associate IP addresses based upon the time of day, the day of week, the calling telephone number, or many other subscriber-defined criteria.

FIG. 2 is a block diagram showing the EP Address Exchange Module 20 residing in a computer system 22. The IP Address Exchange Module 20 operates within a system memory device. The LP Address Exchange Module 20, for example, is shown residing in a memory subsystem 24. The EP Address Exchange Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 3 is a schematic showing the IP Address Exchange Module 20 operating within a telecommunications network 14. This telecommunications network 14 further represents an operating environment for the IP Address Exchange Module 20. The IP Address Exchange Module 20 operates within the memory (such as memory subsystem 24, flash memory 26, or peripheral storage device 28 shown in FIG. 1) of the computer system 22. The IP Address Exchange Module 20 could alternatively operate with the memory of an Internet Protocol (IP) phone 58. The telecommunications network 14 includes a telecommunications switch 60 of a Public Switched Telephone Network 62. The telecommunications switch 60 includes Advanced Intelligent Network (AIN) componentry 64 controlling many features of the telecommunications switch 60. The telecommunications switch 60 could also include a packet-based "softswitch" that uses software control to provide voice, data, and video services by dynamically changing its connection data rates and protocols types. In this case the AIN componentry 64 is replaced by an application server that interfaces with the softswitch via a packet protocol, such as Session Initiation Protocol (SIP). The computer system 22 may also interface with a data network 66 via a connection to the telecommunications switch 60. The packetized signaling between the central office switch 60, the Public Switched Telephone Network 62, the Advanced Intelligent Network 64, and the data network 66, however, is well understood in the art and will not be further described.

Figure 4:
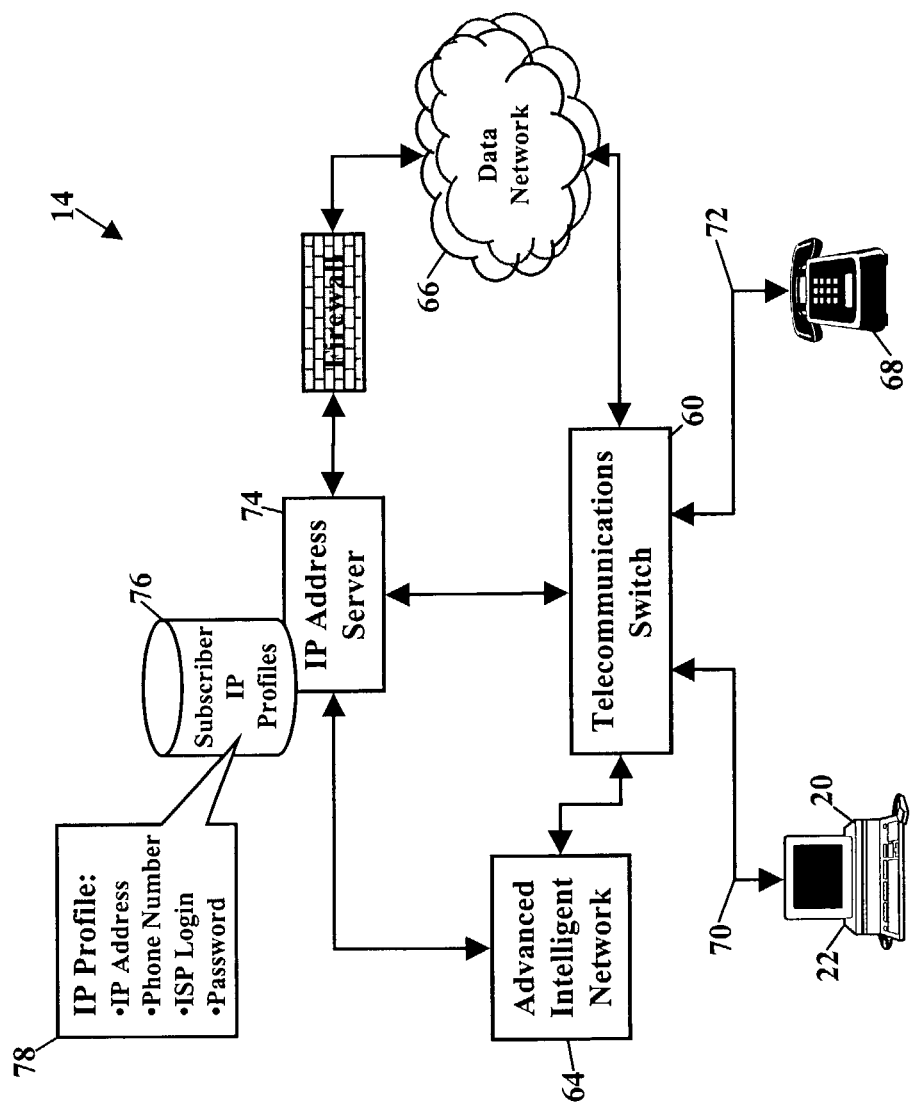
FIG. 4 is a more detailed schematic of a telecommunications network shown in FIG. 3.

FIG. 4 is a more detailed schematic of the telecommunications network 14 shown in FIG. 3. FIG. 4 illustrates how the IP Address Exchange Module 20 may be used to establish an IP profile for a subscriber of the Internet Protocol (IP) address exchange service. The IP Address Exchange Module 20 allows the subscriber to associate an IP address with a telephone 68. FIG. 4, for simplicity, shows the computer system 22 communicating with the telecommunications switch 60 via a data connection 70, while the telephone 68 communicates with the telecommunications switch 60 via a voice connection 72. Both the data connection 70 and the voice connection 72 may comprise a wireline connection (such as a local loop) or a wireless connection (such as a mobile telephone antenna and switch). The computer system 22 thus receives packetized data messages from the data network 66 via the data connection 70 to the telecommunications switch 60, while the telephone 68 receives an incoming telephone call via the voice connection 70 to the telecommunications switch 60. The IP Address Exchange Module 20 may, therefore, be downloaded via the data network 66 from an IP address server 74. The IP Address Exchange Module 20 is stored, and operates, within the memory of the computer system 22.

The IP Address Exchange Module 20 is used to establish an IP profile for the telephone 68. The IP address server 74 stores a database 76 of subscriber IP profiles. A subscriber interacts with the IP Address Exchange Module 20 and with the computer system 22 to access the IP address server 74, to login to the IP address server 74, and to establish an IP profile 78 in the database 76 of subscriber IP profiles. As FIG. 4 shows, the IP profile 78 could contain an IP address associated with the telephone number of the telephone 68. The IP profile 78 may also contain the subscriber's Internet Service Provider (ISP) login information and a password.

Figure 5:
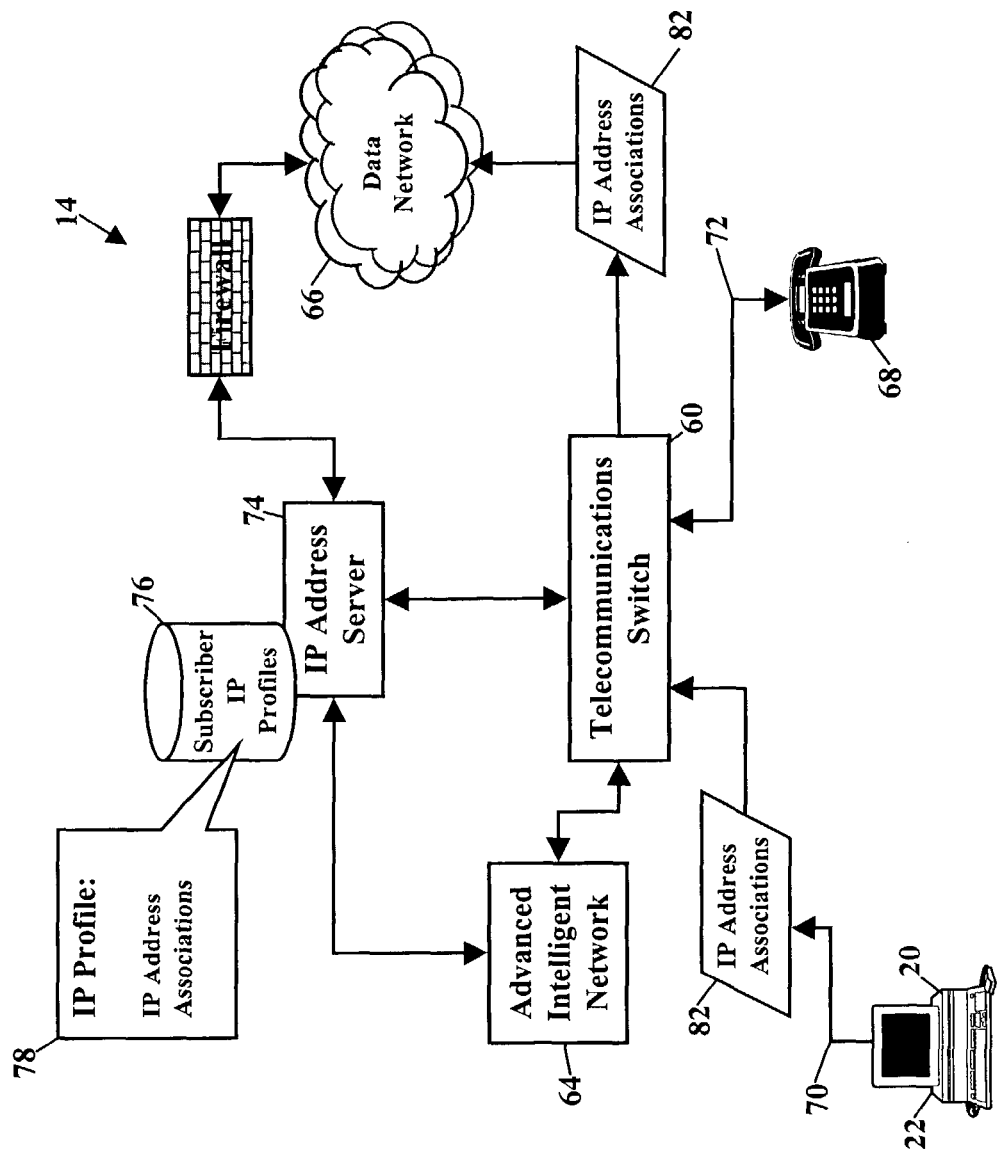
FIG. 5 is a schematic showing another embodiment of this invention allowing a subscriber to associated IP addresses with telephone numbers.

FIG. 5 is a schematic showing the subscriber's IP address associations 82. The IP profile 78 stores IP addresses associated with telephone numbers. The IP profile 78 allows the subscriber to specify what IP address will be exchanged for any of the subscriber's telephone numbers. If the subscriber only has one telephone number, then perhaps the subscriber only wants to associate one IP address with that telephone number. (While a subscriber could associate more than one IP address to a single telephone number, it is envisioned that few subscribers would utilize this capability). If the subscriber has multiple telephone numbers, the IP profile 78 would likely contain an IP address associated to each telephone number. If a telephone number corresponds to a wireline telephone (e.g., a telephone that is fixed in location), the associated IP address would likely be a computer located in the vicinity of the wireline telephone. The associated IP address, of course, need not be in the vicinity of the wireline telephone; that is, the computer could be remotely located from the wireline telephone.

The subscriber may also associate IP addresses with mobile communications devices. If a telephone number corresponds to a mobile communications device, such as a wireless mobile telephone, wireless pager, or wireless personal data assistant (PDA), the subscriber may still associate IP addresses. The IP Address Exchange Module 20 allows the subscriber to specify what IP address is exchanged and under what conditions that IP address is exchanged. The IP Address Exchange Module 20, for example, allows the subscriber to associate a different IP address based upon the time of day and/or the day of week. If, for example, the subscriber has a regularly scheduled meeting each Monday morning, the subscriber could select a first IP address for all calls received between 8-10 AM. This IP address would most likely correspond to a computer in the vicinity of the regularly scheduled Monday meeting. If the subscriber works from home each Friday afternoon, the subscriber may select a second IP address, corresponding to the subscriber's home computer, for all Friday afternoon calls. The IP Address Exchange Module 20 preferably interfaces with a calendar program (such as Microsoft® Outlook®, a registered trademark of Microsoft Corporation, One Microsoft Way, Redmond Wash. 98052-6399, 425.882.8080, www.microsoft.com) stored and operating on the computer system 22. The IP Address Exchange Module 20 could prompt the subscriber to specify IP addresses for each entry/appointment in the calendar.

The IP Address Exchange Module 20 also allows the subscriber to block, or prevent, the exchange of IP addresses. If, for example, the calling party is an unlisted telephone number, the subscriber may not wish to exchange IP addresses. The subscriber may similarly block the exchange of IP addresses for CallerID-Blocked telephone numbers, for "private" telephone numbers, and for "out-of-area" telephone numbers. The subscriber may also block any IP address exchange during certain hours of the day, such as the evening and/or night hours. The IP Address Exchange Module 20 also allows the subscriber to block any EP address exchange for some telephone numbers, such as telemarketers and those parties susceptible to computer viruses.

FIG. 5 shows the subscriber's IP address associations 82 are communicated to the IP address server 76. The IP address associations 82 are communicated via the connection 70, through the telecommunications switch 60, over the data network 66, and to the EP address server 74. The IP profile 78 is then updated with the subscriber's IP address associations 82.

Figure 6:
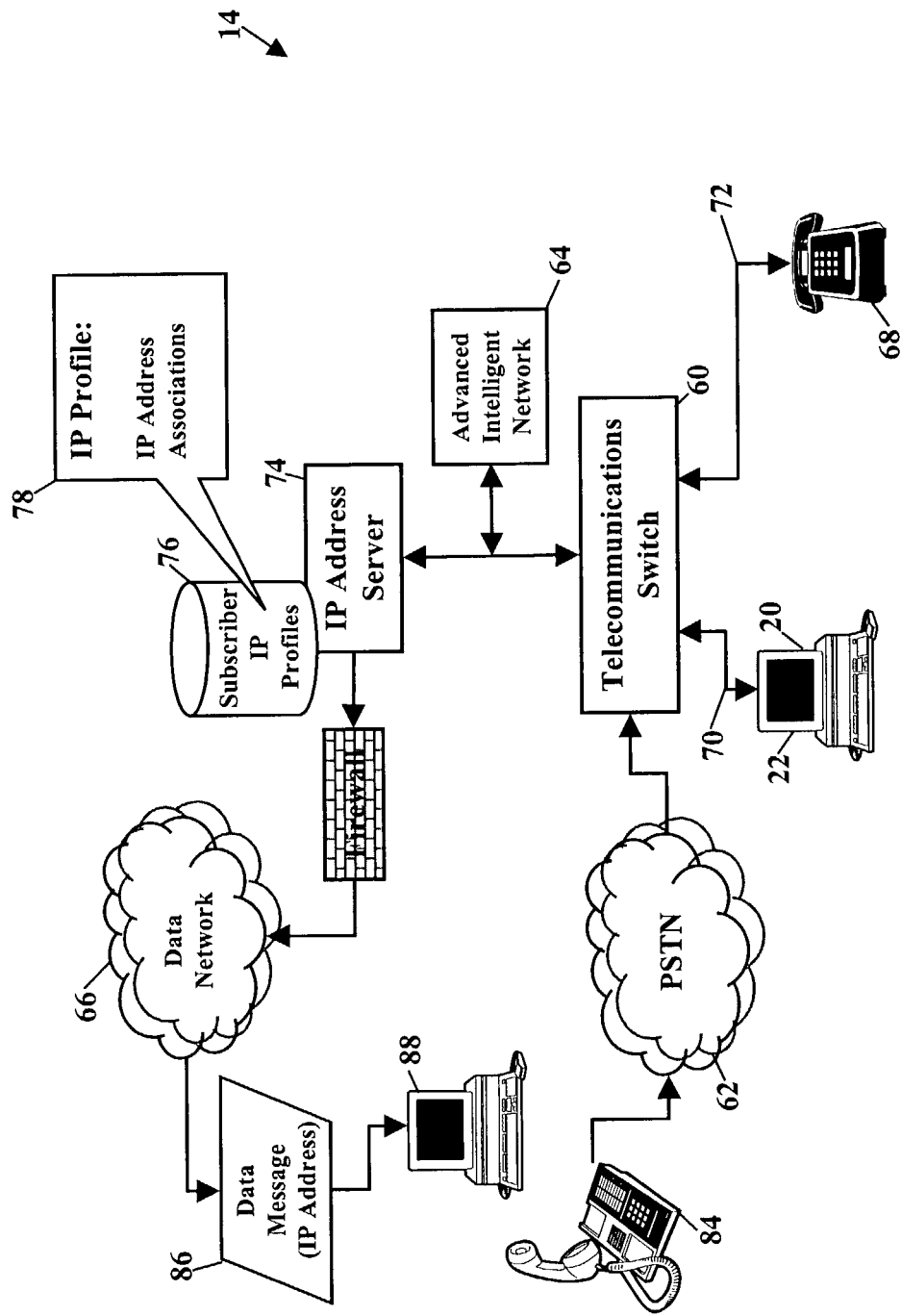
FIGS. 6 and 7 are schematics illustrating an exchange of Internet Protocol (IP) addresses.
Figure 7:
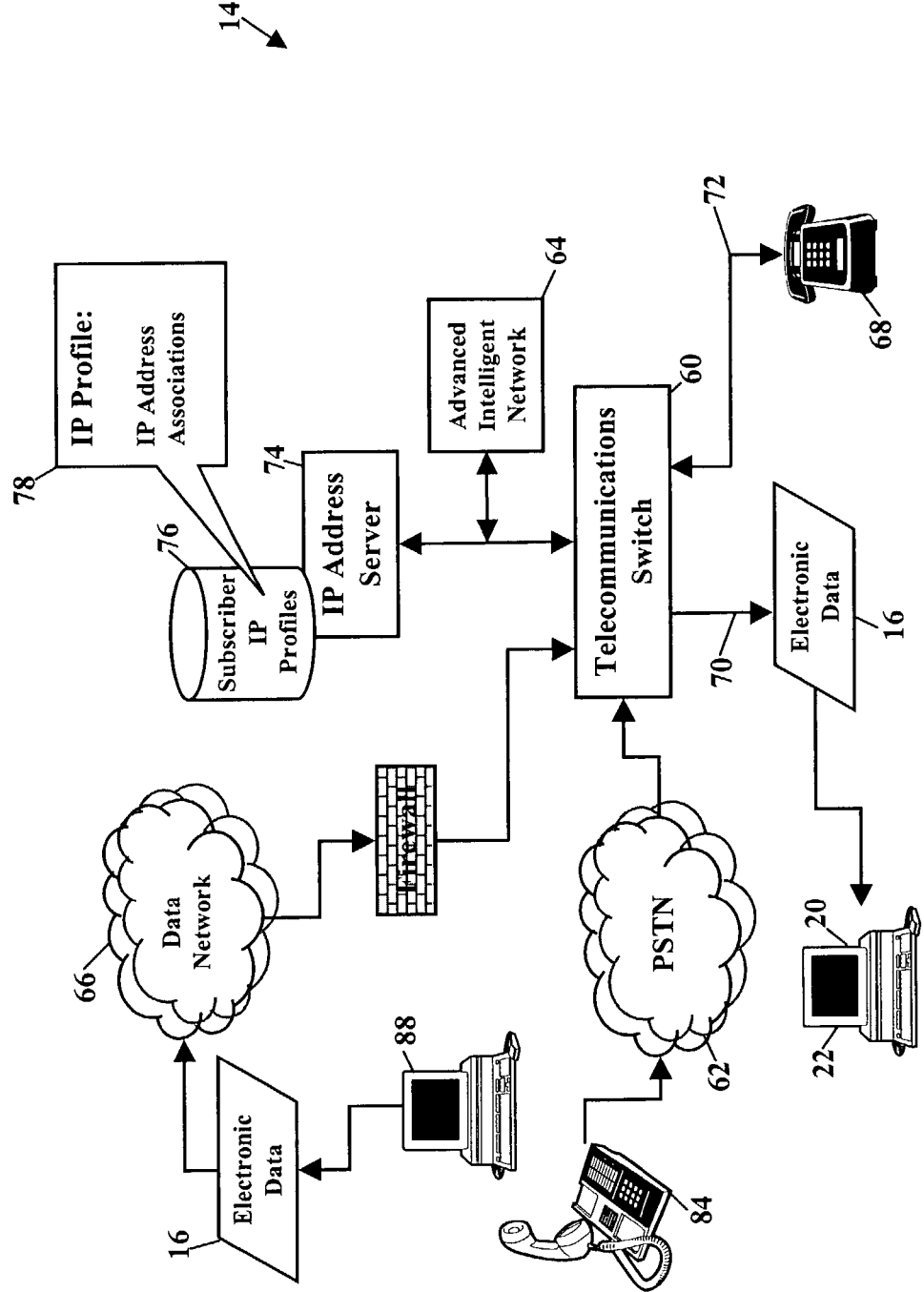

FIGS. 6 and 7 are schematics illustrating the exchange of Internet Protocol (IP) addresses. FIG. 6 shows a calling party receiving an IP address associated with the telephone 68, while FIG. 7 shows the calling party sending, or "pushing," electronic data 16 to computer associated with the telephone 68. As FIG. 6 shows, a calling party uses a communications device to place a telephone call to the telephone 68. FIG. 6 shows the communications device as a telephone 84. The telephone call is routed from the telephone 84 and into the Public Switched Telephone Network 62. If, on the other hand, the communications device is a wireless device, the telephone call is transmitted to an antenna (not shown), then coupled to a mobile switch (also not shown), and then routed into the Public Switched Telephone Network 62. The Public Switched Telephone Network 62 routes the telephone call to the local central office telecommunications switch 60 serving the telephone 68 corresponding to the called telephone number. The intelligence controlling the telecommunications switch 60 (such as the Advanced Intelligence Network 64) detects that Internet Protocol (IP) address exchange service is required (the AIN environment, for example, would detect a trigger for the Internet Protocol (IP) address exchange service). Processing of the telephone call is suspended and a query is sent to the called party's IP Address server 74 for the associated IP address. The IP Address server 74 accesses the subscriber's IP profile 78, reads the subscriber's IP address associations, and selects which IP address is associated with the called telephone number.

Once the associated IP address is selected, the IP Address server 74 then communicates that IP address to the calling party. The fP Address server 74 causes an IP Address message 86 to be routed over the data network 66. The data message 86 includes information associated with the subscribing telephone number's associated IP address. The data message 86 is addressed to an Internet Protocol address associated with the calling party. The data message 86 routes over the data network 66 and to a computer system 88 designated by the caller's Internet Protocol address. Because the data message 86 includes information associated with the calling party's selected IP address, FIG. 7 shows the calling party may then send, or "push," the electronic data 16 to the IP address of the called party. The electronic data 16 routes to the called party's associated computer 22 via the data network 66 and via the local central office telecommunications switch 60 serving the computer 22. This electronic data 16 could be pictures, charts, files, or any other electronic data 16 that augments, explains, and/or accompanies the telephone conversation. As the parties converse via the telephone connection, the called party may simultaneously view this electronic data 16 on the computer 22.

Figure 8:
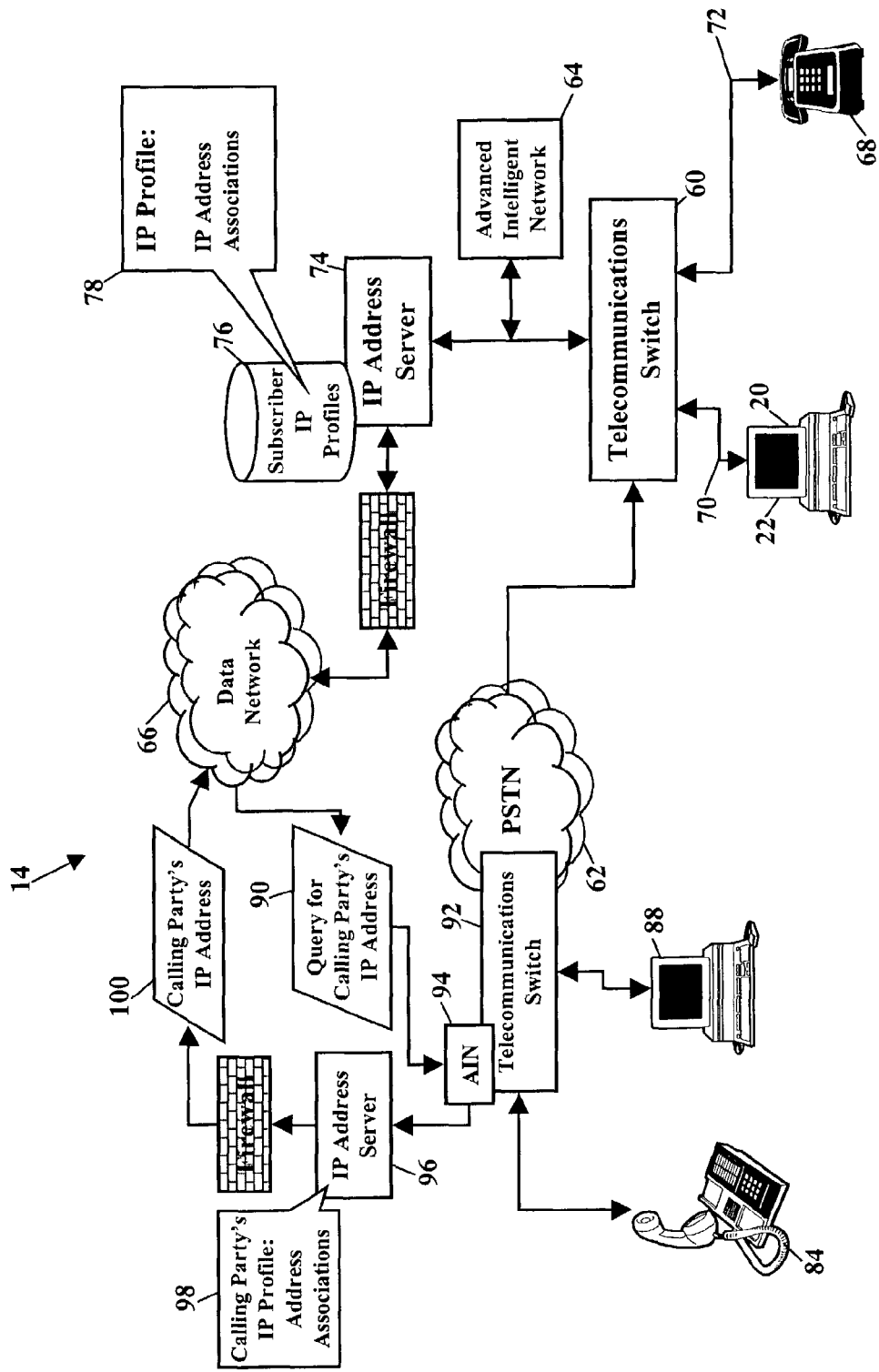
FIG. 8 is a schematic showing an alternative embodiment of this invention that queries for a calling party's IP address.

FIG. 8 is a schematic showing an alternative embodiment of this invention. Here the called party's IP Address server 74 sends a query 90 for the calling party's IP address. This query 90 routes via the data network 66 to the telecommunications switch 92 serving the calling party. The intelligence controlling the telecommunications switch 92 (such as the Advanced Intelligence Network 94) queries the calling party's IP Address server 96 for the associated IP address of the calling party. The calling party's IP Address server 96 accesses the calling party's IP profile 98, reads the calling party's IP address associations, and selects which IP address the calling party has associated with the calling telephone number. Now that the calling party's IP address is known, the calling party's IP Address server 96 causes a message 100 to be communicated to the called party's IP address server 74 via the data network 66. This message 100 contains information representing the calling party's IP address. The called party's IP address server 74 now knows the associated IP address of the calling party, so the called party's IP address server 74 causes the data message 86 to be routed over the data network 66. The data message 86 (as FIG. 6 explained) includes information associated with the calling party's selected IP address. The data message 86 routes over the data network 66 to the Internet Protocol address associated with the calling party (such as the called party's associated computer 22 and the calling party's associated computer 88).

FIGS. 6 and 8 also illustrate the exchange of IP addresses. FIG. 6 illustrated how the calling party receives the associated IP address of the called party, and FIG. 8 illustrated how the called party may receive the associated IP address of the calling party. Hence, the parties to the telephone call now know each other's associated IP address. The parties to the telephone call have exchanged IP addresses, and the parties may now augment their telephone conversation with the electronic data (shown as reference numeral 16 in FIGS. 1 and 7). Each party may send, or "push," pictures, charts, files, or any other electronic data to the associated IP address of the other party. The electronic data routes to the other party's associated computer (22 or 88). As the parties converse via the telephone connection, each party may simultaneously view this electronic data on their associated computer 22, 88.

Figure 9:
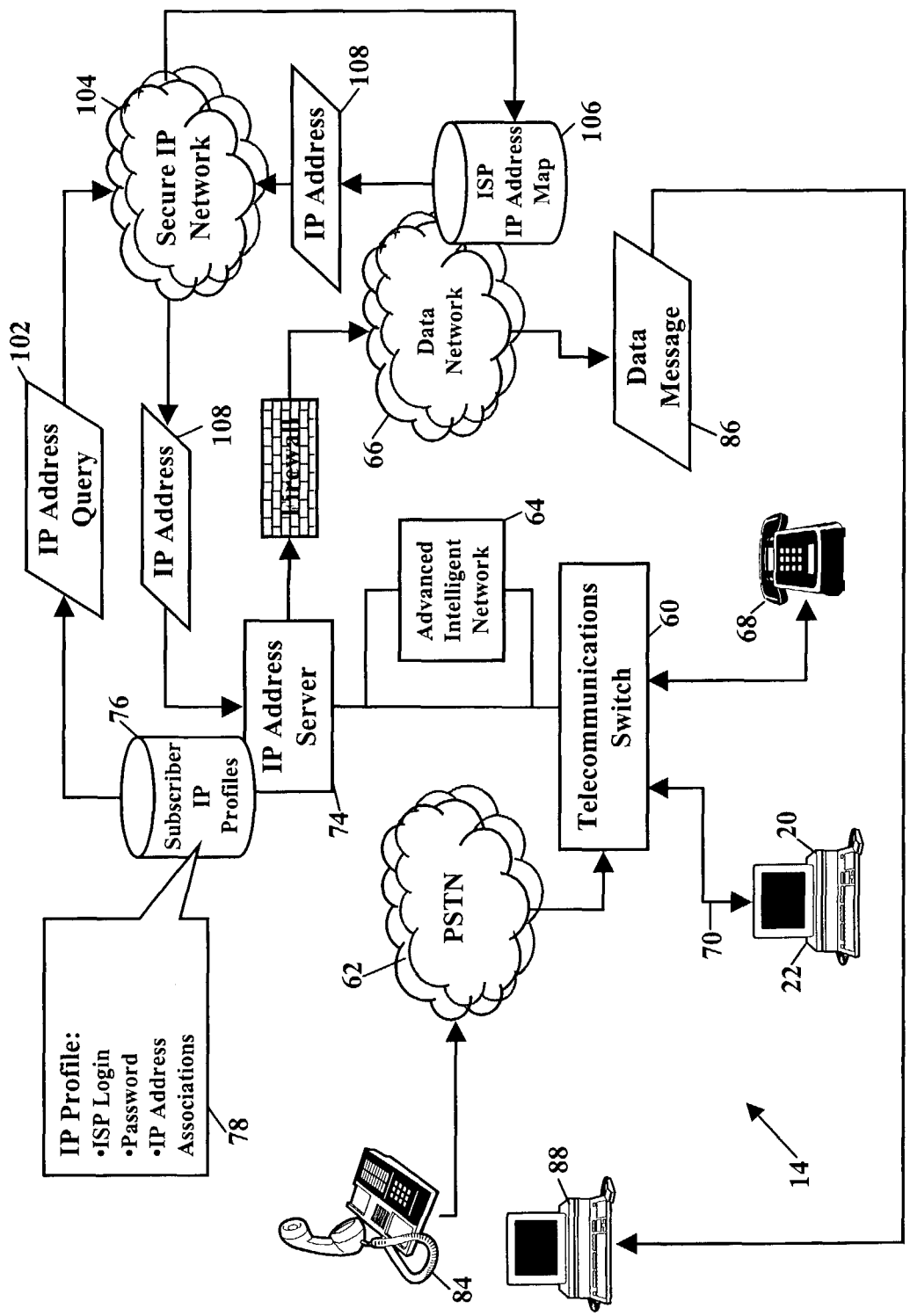
FIGS. 9 and 10 are schematics illustrating more embodiments of this invention for dynamic Internet Protocol addressing.

FIG. 9 is a schematic illustrating yet another embodiment of this invention. FIG. 9 illustrates a call flow for dynamic Internet Protocol addressing. Some Internet Service Providers assign a "static" Internet Protocol address to a user's account, whereas other Internet Service Providers dynamically change a user's Internet Protocol address. A static Internet Protocol address is permanently assigned to the user, while a dynamic Internet Protocol address may change with each login or may dynamically change during a session. FIG. 9 illustrates additional queries that are made for dynamic Internet Protocol addressing.

FIG. 9 similarly routes the call as shown in FIGS. 6-8. The telephone call routes from the calling telephone 84, into the Public Switched Telephone Network 62, and to the local central office telecommunications switch 60 serving the called telephone 68. The intelligence controlling the telecommunications switch 60 detects a request for IP address exchange service and the call is suspended. A query is sent to the IP Address server 74 for the associated IP address of the called telephone number. The IP Address server 74 accesses the subscriber's IP profile 78 and determines that the subscriber has a dynamic IP address. An IP address query 102 is sent from the IP Address server 74, routed over a secure IP network 104, and to an Internet Service Provider serving the called party's computer system 22. The IP address query 102 requests the current Internet Protocol address assigned to the computer system 22. FIG. 9 shows the current Internet Protocol address being retrieved from a database 106 that maps telephone numbers to Internet Protocol addresses. The current Internet Protocol address, for example, could be determined from the Internet Service Provider login information. If the ISP login information contained within the profile 78 matches the Internet Service Provider's login information, then the IP Address server 74 could have access to the database 106.

Regardless of how the Internet Protocol address is accessed, the current IP address 108 is returned. The current IP address 108 routes over the secure IP network 104 and to the IP Address server 74. With the current Internet Protocol address known, the IP Address server 74 may now send the data message 86. The data message 86, including information associated with the current IP address, is sent to the Internet Protocol address associated with the calling telephone number. The data message 86 routes over the data network 66 and to the computer system 88 associated with the calling telephone number. The calling party may now send, or "push," pictures, charts, files, or any other electronic data to the IP address of the called party. As the parties converse via the telephone connection, the called party may simultaneously view this electronic data on the computer 22.

Figure 10:
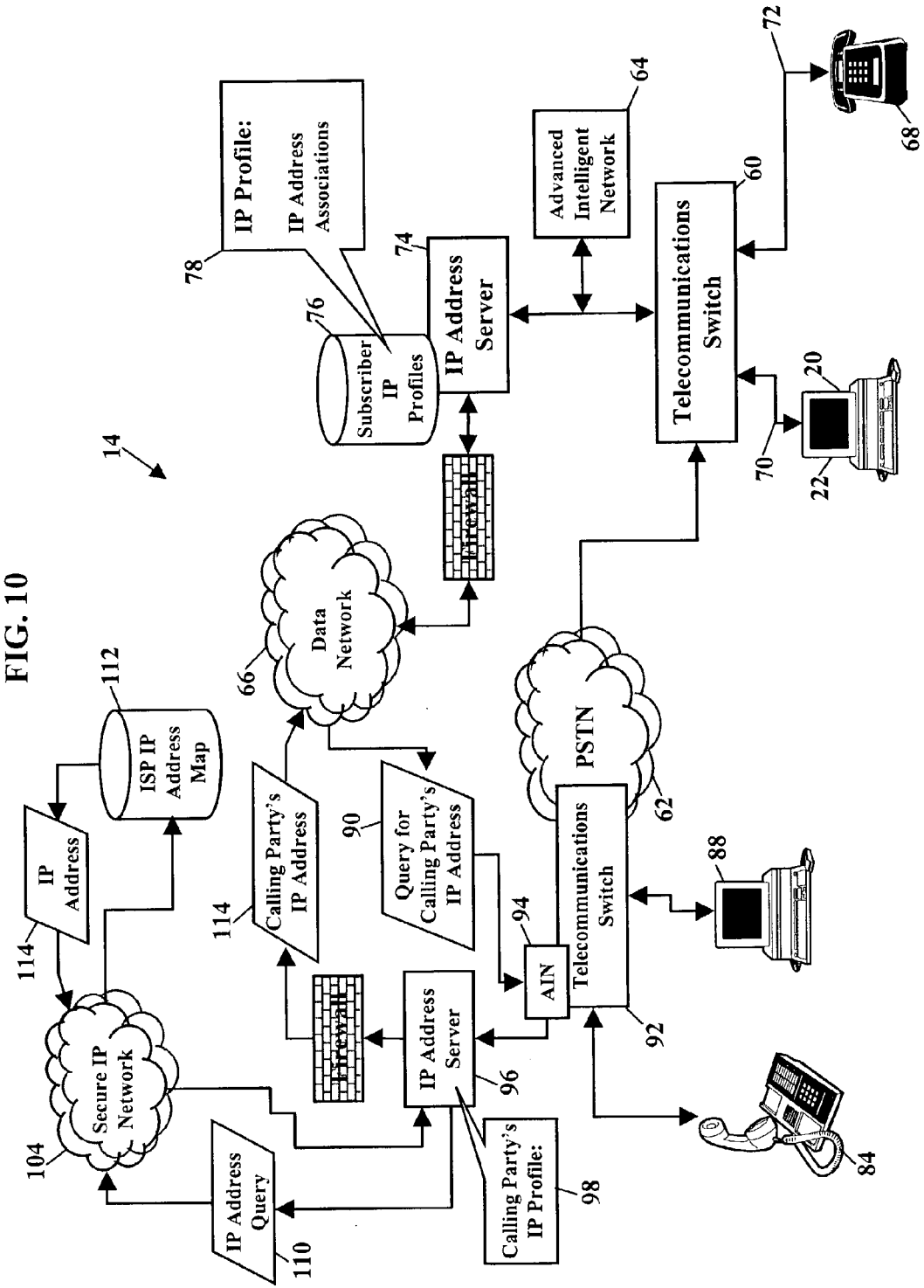

FIG. 10 is a schematic illustrating yet another aspect for calling parties with dynamic IP addressing. Here the Internet Service Provider (ISP) of the calling party must be queried for an IP address. The called party's IP Address server 74 sends the query 90 for the calling party's IP address. This query 90 routes via the data network 66 to the initiation telecommunications switch 92 serving the calling party. The intelligence controlling the telecommunications switch 92 (such as the Advanced Intelligence Network 94) queries the calling party's IP Address server 96 for the associated IP address of the calling party. The calling party's IP Address server 96 accesses the calling patty's IP profile 98 and determines that the calling telephone number has an associated dynamic IP address. An IP address query 110 is sent from the calling party's IP Address server 96, routed over the secure IP network 104, and to the calling party's Internet Service Provider. The IP address query 110 requests the current Internet Protocol address assigned to the computer system 88 associated with the calling telephone number. The current Internet Protocol address is retrieved from a database 112 that maps telephone numbers to Internet Protocol addresses. If the ISP login information contained within the calling party's IP profile 98 matches the Internet Service Provider's login information, then the calling party's IP Address server 96 could have access to the database 112.

The calling party's current IP address 114 is returned. The current IP address 114 routes over the secure IP network 104 and to the calling party's IP Address server 96. The calling party's IP Address server 96 then communicates the calling party's current IP address 114 to the called party's IP Address server 74 via the data network 66. Now that the called party's IP Address server 74 knows the current IP address associated with the calling party, the called party's IP Address server 74 sends the data message 86. The data message 86, as FIG. 6 and the accompanying text explained, includes information representing the current IP address associated with the calling party. The data message 86 routes over the data network 66 and to the computer system 88 associated with the calling telephone number. The calling party may now send, or "push," web pages, pictures, charts, files, or any other electronic data to the fp address of the called party. As the parties converse via the telephone connection, the called party may simultaneously view this electronic data on the computer 22.

Figure 11:
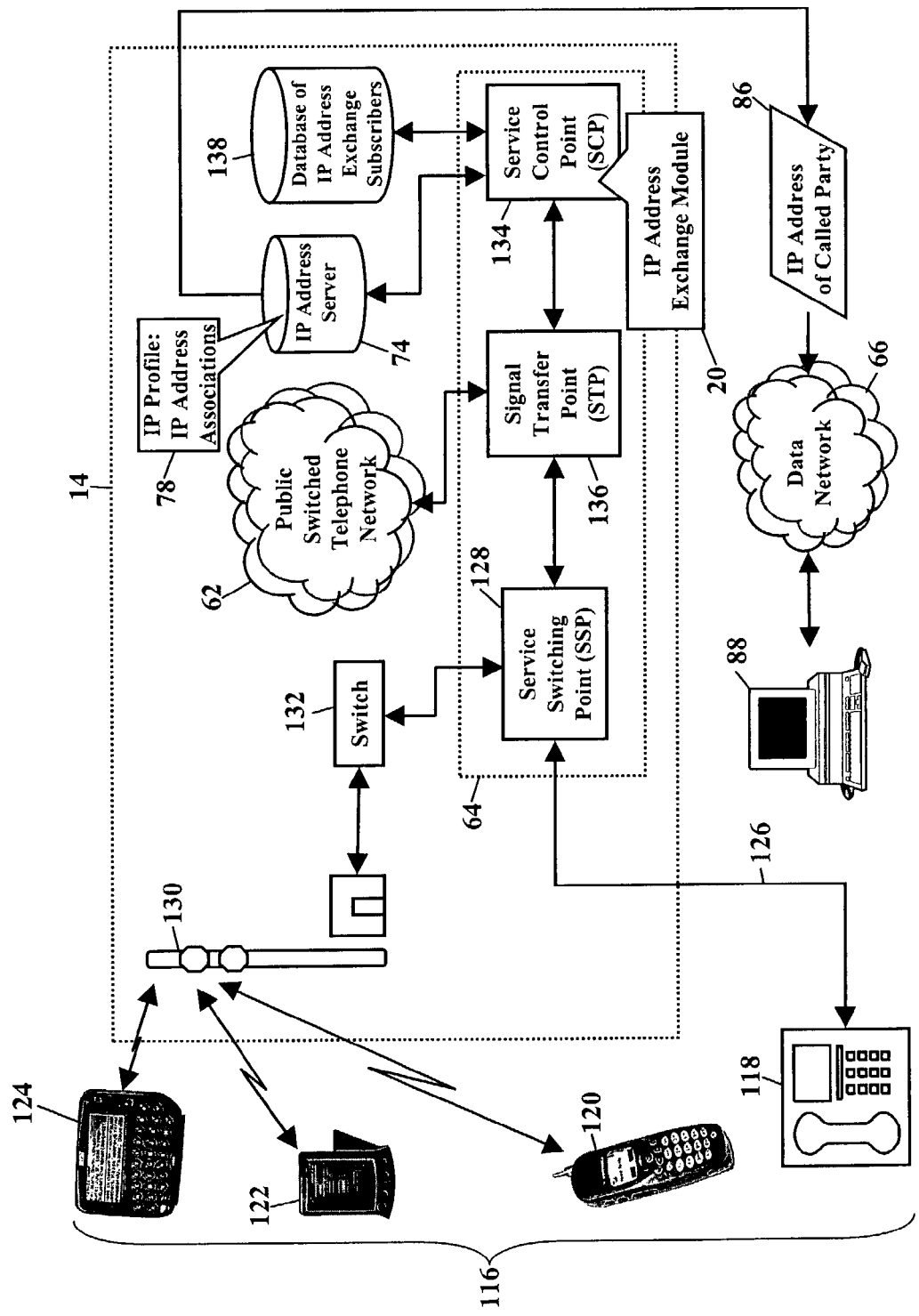
FIG. 11 is a schematic illustrating still another embodiment of this invention having the telecommunications network incorporating an IP Address Exchange Module.

FIG. 11 is a schematic illustrating still another embodiment of this invention having the telecommunications network 14 incorporating the IP Address Exchange Module 20. This telecommunications network 14 further represents an operating environment for the IP Address Exchange Module 20. The telecommunications network 14 may interface with the Public Switched Telephone Network 62, and the telecommunications network 14 includes the Advanced Intelligent Network (AIN) 64 controlling many features of the Public Switched Telephone Network 62. The telecommunications network 14 and the Advanced Intelligent Network 64, however, are well understood and will only be simply described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

As FIG. 11 shows, a calling communications device 116 (e.g., the calling party and the calling telephone number) places a telephone call to the called telephone number corresponding to the called party. As those of ordinary skill in the art of communications understand, the calling communications device 116 could be a common wireline telephone 118, a wireless/mobile telephone 120, a wireless personal data assistant 122, or a wireless pager 124. The call could be routed from the common wireline telephone 118, along a landline 126, and received at a Service Switching Point (SSP) 128. The term "wireline" means the telephone 118 sends and receives signals using conductors of electricity. These conductors are commonly the copper wires of a telephone system local loop; however, the term "wireline" also encompasses fiber conductors. The call, instead, could be wirelessly coupled to an antenna 130, then coupled to a telecommunications switch 132, and then received by the Service Switching Point 128. The Service Switching Point 128 sends packets of data to a Service Control Point (SCP) 134 via a high-speed packet switch, commonly termed a Signal Transfer Point (STP) 136. These packets of data may include the telephone number of the called party and the telephone number of the calling party. If the calling party is a subscriber to this IP address exchange service, these packets of data may also include an IP address associated with the calling telephone number. The Service Switching Point 128 then suspends processing of the communication and waits for instructions from the Service Control Point 134.

The term "processing," as used herein, encompasses every event from the time the calling communications device 116 goes off-hook to the termination of the telephone call. "Processing" of the telephone call includes routing a voice path and signaling setup and intelligence (e.g., Local Number Portability queries, queries to retrieve Calling Name/Number information, AIN queries, and standard signaling messages to determine call routing paths). The term "processing" also includes monitoring an established telephone call for possible DTMF entry, switch hook flash, other events that indicate a party on the telephone call has requested something, and delivery of call waiting tones and data. "Processing," however, also encompasses billing activities and measurements at a switch or other network element. The Service Switching Point 128, then, suspends processing of the telephone call and waits for instructions from the Service Control Point 134.

The IP Address Exchange Module 20 determines if the called telephone number subscribes to the IP address exchange service. The IP Address Exchange Module 20 comprises a computer program operating at, or communicating with, the Service Control Point 134. The IP Address Exchange Module 20 instructs the Service Control Point 134 to query a database 138 of IP address exchange subscribers. If the database 138 of IP address exchange subscribers contains the called telephone number, or the calling telephone number, then the Service Control Point 134 queries the IP Address server 74 for the associated IP address. The IP Address server 74 accesses the subscriber's IP profile 78, reads the subscriber's IP address associations, and selects which IP address is associated with the called telephone number.

Once the associated IP address is selected, the IP Address server 74 then communicates that IP address to the calling party. The IP Address server 74 causes the data message 86 to be routed over the data network 66. The data message 86 includes information representing the IP address of the associated called telephone number. The data message 86 is addressed to an Internet Protocol address associated with the calling party. The data message 86 routes over the data network 66 and to the caller's Internet Protocol address (such as the computer 88 associated with the calling party). The calling party may now send, or "push," web pages, pictures, charts, files, or any other electronic data to the IP address of the called party. As the parties converse via the telephone connection, the called party may simultaneously view this electronic data on a computer.

Figure 12:
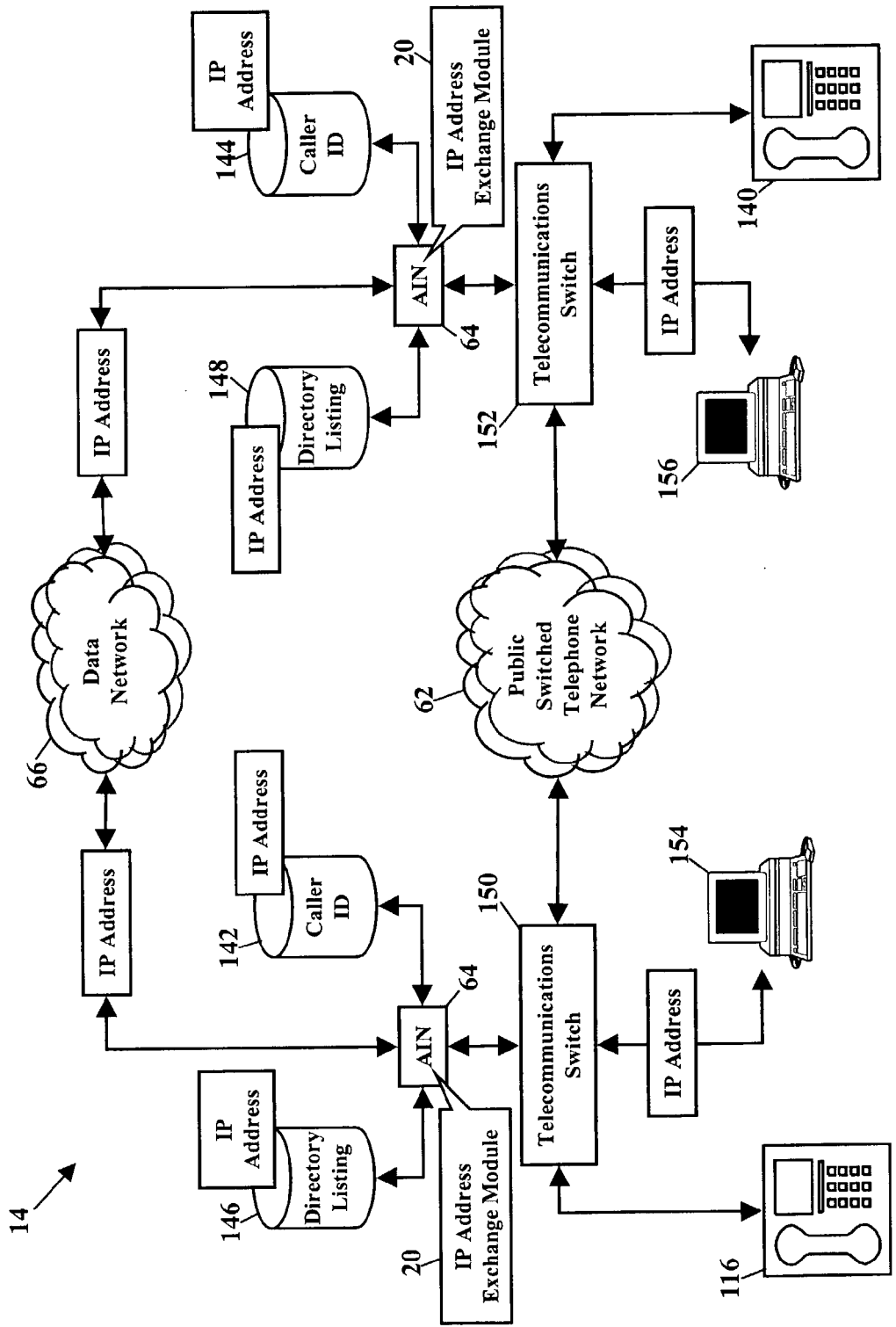
FIG. 12 is a schematic showing another embodiment of this invention utilizing a directory listing database and/or a Caller Identification (e.g., "CallerID") database.

FIG. 12 is a schematic showing another embodiment of this invention utilizing a directory listing database and/or a Caller Identification (e.g., "Caller ID") database. This embodiment illustrates how existing telecommunication services, such as the "Caller ID" service and/or the directory listing service (such as "Caller Name" service or other similar services), may be modified to provide this IP address exchange service. As FIG. 12 shows, a calling communications device 116 (e.g., the calling party and the calling telephone number) places a telephone call to the called telephone number corresponding to the called party (the called communications device 140). This embodiment utilizes calling party identification databases (such as "Caller ID" databases 142, 144) and/or directory listing databases 146, 148 to provide IP addresses for the parties to the call. As those of ordinary skill in the art of telecommunications understand, the "Caller ID" service is transmitted as a data parameter in the SS7 Initial Address Message from the originating telecommunications switch 150 to the destination telecommunications switch 152 in the process of setting up the call. The directory listing (e.g., "Caller Name") service provides directory name listing information derived from the directory listing databases 146 and 148. The directory listing databases 146, 148 (such as a "Listing Database" or "LIDB") contains up-to-date records of all working lines, including directory listing name, description of the type of dialing capability (rotary dial or touch-tone), calling card numbers, and other data.

FIG. 12 illustrates various schemes for providing an IP address exchange service. The IP addresses, associated with the calling party's telephone number 116 and with the called party's telephone number 140, could be included as a data parameter in the signaling from/between the originating telecommunications switch 150 and the destination telecommunications switch 152. This signaling could occur at any time during the processing of the call. The telecommunications switches 150 and 152 could communicate these signals via the data network 66 and/or via the Public Switched Telephone Network 62. Whatever the path the signals take, the called party's associated IP address and/or the calling party's associated IP address may be included with this signaling. The associated IP addresses could then be communicated to the respective parties to the call (such as the calling party's associated computer 154 and the called party's associated computer 156), allowing each party to push web pages, pictures, charts, files, and any other electronic data to the other party. As the parties converse via the telephone connection, the parties may simultaneously view this electronic data on their respective computer 154, 156.

FIG. 12 also illustrates the associated IP addresses could be obtained from other sources. The associated IP addresses, for example, could be retrieved from the calling party identification databases, such as the "Caller ID" databases 142 and 144. The associated IP address for the calling party, for example, could be merged with, or retrieved from, the calling party identification database 142 at the originating telecommunications switch 150. The associated IP address for the called party, likewise, could be merged with, or retrieved from, the calling party identification database 144 at the destination telecommunications switch 152. FIG. 12 also shows associated IP addresses could be retrieved from the directory listing databases 146, 148. The associated IP address for the calling party, for example, could be merged with, or retrieved from, the directory listing database 146 at the originating telecommunications switch 150. The associated IP address for the called party, likewise, could be merged with, or retrieved from, the directory listing database 148 at the destination telecommunications switch 152. The associated IP addresses could then be communicated to the respective parties to the call (e.g., the calling party's associated computer 154 and the called party's associated computer 156), again allowing each party to push web pages, pictures, charts, files, and any other electronic data to the other party. As the parties converse via the telephone connection, the parties may simultaneously view this electronic data on their respective computer 154, 156.

FIG. 12 may also be used to illustrate other features of this IP address exchange service. Either party to the call may configure their IP profile (shown as reference numeral 78 in FIGS. 4-11) to prevent, or "block," the exchange of their IP address. This "block" could be configured for all telephone calls, for only calls received from certain telephone numbers, for certain times of the day, and/or for certain days of the week. Thus, even if one party to the call communicates their associated IP address, the other party to the call need not participate.

The telecommunications network 14 may also prompt for IP addresses. Either party may configure their IP profile to "prompt" for the associated IP address. That is, one party might want to authorize receipt of the other's party's associated IP address and/or authorize communication of their own associated IP address. Either party to the call could hear a prerecorded invitation to exchange associated IP addresses. If a party wants to exchange their associated IP address, that party could authorize the exchange by speaking "Yes" and/or by using Dual Tone Multi-Frequency (DTMF) entries. As those of ordinary skill in the art understand, DTMF signaling is a means of transferring information from a party to the telecommunications network 14 through the use of in-band audio tones. Each digit of information is assigned a simultaneous combination of one of a lower group of frequencies and one of a higher group of frequencies to represent each digit or character. A party, for example, might authorize communication of their associated IP address by entering a "1" on a touch-tone keypad. This entry would then authorize the telecommunications network to retrieve the associated IP address and communicate that IP address to the other party. Entering a "2" on the touch-tone keypad might decline any communication of that party's associated IP address. Entering a "3" might authorize receipt of the other party's associated IP address, while "4" might decline receipt. This authorization would allow either party, in real time during the telephone call, to authorize or to decline this IP address exchange service. The calling party might enter "*93" before dialing to automatically block any exchange of IP addresses.

The IP Address Exchange Module (shown as reference numeral 20 in FIGS. 2-12) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the IP Address Exchange Module to be easily disseminated. A computer program product for communicating Internet Protocol addresses between parties to a telephone call comprises the computer-readable medium and the IP Address Exchange Module. The IP Address Exchange Module is stored on the computer-readable medium.

The IP Address Exchange Module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
processing a telephone call from a calling number to a network server serving a called number;
suspending processing of the telephone call at the network server prior to termination at the called number;
querying a telecommunications switch to determine if the calling number is a subscriber to an Internet Protocol address exchange service;
when the calling number subscribes to the Internet Protocol address exchange service, then retrieving a calling party's Internet Protocol address from the telecommunications switch, the calling party's Internet Protocol address being associated with the calling number according to a time and day, the calling number having associations to different Internet Protocol addresses based on the time and the day;
querying the telecommunications switch to determine if the called number subscribes to the Internet Protocol address exchange service;
when the called number subscribes to the Internet Protocol address exchange service, retrieving a called party's Internet Protocol address from the telecommunications switch, the called party's Internet Protocol address being associated with the called number according to the time and day, the called number having associations to different Internet Protocol addresses based on the time and the day;
resuming processing of the telephone call at the network server;
terminating the telephone call at the called number;
sending the calling party's Internet Protocol address during the telephone call as a packet of data over a data network from the network server to a called party's communications device associated with the called party's Internet Protocol address; and
sending the called party's Internet Protocol address during the telephone call over the data network from the network server to a calling party's communications device associated with the calling party's Internet Protocol address.

2. The method according to claim 1, wherein when the calling number is unlisted, then declining to exchange the called party's Internet Protocol address.

3. The method according to claim 1, wherein when caller identification information is blocked, then declining to exchange the called party's Internet Protocol address.

4. The method according to claim 1, wherein when the calling number is private, then declining to exchange the called party's Internet Protocol address.

5. The method according to claim 1, further comprising blocking an exchange of the called party's Internet Protocol address during predefined hours of the day.

6. The method according to claim 1, further comprising blocking an exchange of the called party's Internet Protocol address when the calling number is out of area.

7. The method according to claim 1, further comprising blocking an exchange of the calling party's Internet Protocol address during predefined hours of the day.

8. The method according to claim 1, further comprising declining to send the called party's Internet Protocol address when the calling number is associated with a telemarketer.

9. The method according to claim 1, wherein processing the telephone call comprises processing an Internet Protocol address associated with a telephone number.

10. The method according to claim 1, further comprising receiving the calling party's Internet Protocol address associated with the calling number.

11. The method according to claim 1, further comprising retrieving the calling party's Internet Protocol address from a database storing directory listing information associated with the calling number.

12. The method according to claim 1, further comprising retrieving the called party's Internet Protocol address from a database storing directory listing information associated with the called number.

13. The method according to claim 1, further comprising retrieving the calling party's Internet Protocol address from a database storing directory listing information.

14. The method according to claim 1, further comprising retrieving the calling party's Internet Protocol address from a database storing caller identification information.

15. The method according to claim 1, further comprising prompting the called party's communications device during the telephone call to at least one of authorize and prevent communication of the called party's Internet Protocol address.

16. A method for exchanging Internet Protocol addresses between parties to a telephone call, the method comprising:
receiving selections of IP addresses that are associated with telephone numbers and with different times;
storing the selections in a network database for an Internet Protocol address exchange service provided by a telecommunications switch;
routing the telephone call from a calling number to a network server serving a called number;
suspending processing of the telephone call at the network server prior to termination at the called number;
querying the telecommunications switch for the called number and for the calling number, the telecommunications switch accessing telephone numbers of subscribers to the Internet Protocol address exchange service that exchanges Internet Protocol addresses during the telephone call;
retrieving from the telecommunications switch a calling party's Internet Protocol address that a calling party has associated with the calling number according to a time and day, the calling number having associations to different Internet Protocol addresses based on the time and the day;
retrieving from the telecommunications switch a called party's Internet Protocol address that a called party has associated with the called number according to a time and day, the called number having associations to different Internet Protocol addresses based on the time and the day;
resuming processing of the telephone call at the network server;
terminating the telephone call at the called number;
sending the calling party's Internet Protocol address during the telephone call as a packet of data over a data network from the network server to a called party's communications device associated with the called party's Internet Protocol address;
sending the called party's Internet Protocol address during the telephone call over the data network from the network server to a calling party's communications device associated with the calling party's Internet Protocol address;
retrieving electronic data; and
communicating the electronic data during the telephone call over the data network between the calling party's Internet Protocol address and the called party's Internet Protocol address to augment the telephone call.

17. The method for exchanging Internet Protocol addresses according to claim 16, wherein when the calling number is unlisted, then declining to exchange the called party's Internet Protocol address.

18. The method for exchanging Internet Protocol addresses according to claim 16, wherein when caller identification information is blocked, then declining to exchange the called party's Internet Protocol address.

19. The method for exchanging Internet Protocol addresses according to claim 16, wherein when the calling number is private, then declining to exchange the called party's Internet Protocol address.

20. A system, comprising:
a processor; and
memory for storing code that when executed causes the processor to perform operations, the operations comprising:
processing a telephone call from a calling number;
suspending processing of the telephone call at a network server prior to termination at a called number;
sending a query during suspension from the network server to a telecommunications switch that accesses associations between Internet Protocol addresses and telephone numbers;
retrieving from the telecommunications switch a calling party's Internet Protocol address during the call that is associated with the calling number;
retrieving from the telecommunications switch a called party's Internet Protocol address during the call that is associated with the called number;
resuming processing of the telephone call at the server;
terminating the telephone call at the called number;
sending the calling party's Internet Protocol address during the telephone call as a packet of data over a data network from the network server to a called party's communications device associated with the called party's Internet Protocol address; and
sending the called party's Internet Protocol address during the telephone call over the data network from the network server to a calling party's communications device associated with the calling party's Internet Protocol address.

* * * * *